(12) United States Patent
Shannon et al.

(10) Patent No.: US 7,595,364 B2
(45) Date of Patent: *Sep. 29, 2009

(54) HIGH DENSITY POLYETHYLENE

(75) Inventors: Porter Clarke Shannon, Seabrook, TX (US); Fred D. Ehrman, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 534 days.

This patent is subject to a terminal disclaimer.

(21) Appl. No.: 11/296,104

(22) Filed: Dec. 7, 2005

(65) Prior Publication Data

US 2007/0129496 A1    Jun. 7, 2007

(51) Int. Cl.
C08L 23/00 (2006.01)
C08L 23/04 (2006.01)
C08L 23/06 (2006.01)

(52) U.S. Cl. .................... 525/191; 525/240

(58) Field of Classification Search ............... 525/191, 525/240

See application file for complete search history.

(56) References Cited

U.S. PATENT DOCUMENTS

| | | | | |
|---|---|---|---|---|
| 5,350,807 | A | 9/1994 | Pettijohn et al. | 525/240 |
| 5,962,598 | A | 10/1999 | Mack et al. | 525/333.8 |
| 6,063,871 | A | 5/2000 | Kishine et al. | 525/240 |
| 6,090,893 | A | 7/2000 | Harlin et al. | 525/240 |
| 6,185,349 | B1 | 2/2001 | Dammert et al. | 385/100 |
| 6,201,078 | B1 | 3/2001 | Breulet et al. | 526/113 |
| 6,204,349 | B1 | 3/2001 | Shinohara et al. | 526/352.2 |
| 6,388,017 | B1 | 5/2002 | McDaniel et al. | 525/240 |
| 6,433,095 | B1 | 8/2002 | Laurent | 525/240 |
| 6,441,096 | B1 | 8/2002 | Bäckman et al. | 525/240 |
| 6,455,660 | B1 | 9/2002 | Clutton et al. | 526/352 |
| 6,462,135 | B1 | 10/2002 | Rohde et al. | 525/191 |
| 6,489,427 | B1 | 12/2002 | Clutton et al. | 526/352 |
| 6,545,093 | B1 | 4/2003 | de Lange et al. | 525/191 |
| 6,642,313 | B1 | 11/2003 | Kazakov et al. | 525/191 |
| 6,716,924 | B2 | 4/2004 | Tsutsui et al. | 525/193 |
| 6,770,341 | B1 | 8/2004 | Böhm et al. | 428/35.7 |
| 6,770,715 | B2 | 8/2004 | Garrison et al. | 525/240 |
| 6,809,154 | B2 | 10/2004 | Lindahl et al. | 525/191 |
| 6,841,621 | B2 | 1/2005 | Krümpel et al. | 525/191 |
| 6,867,278 | B2 | 3/2005 | McDaniel et al. | 526/348.5 |
| 6,878,454 | B1 | 4/2005 | Shannon et al. | 428/523 |
| 6,946,521 | B2 | 9/2005 | Miserque et al. | 525/191 |
| 6,953,831 | B2 | 10/2005 | Ishihama et al. | 526/352 |
| 2005/0234197 | A1* | 10/2005 | Goldberg et al. | 525/240 |
| 2006/0275571 | A1* | 12/2006 | Mure et al. | 428/36.9 |
| 2006/0281867 | A1* | 12/2006 | Jaker | 525/240 |

FOREIGN PATENT DOCUMENTS

| | | |
|---|---|---|
| EP | 0 350 339 | 1/1990 |
| EP | 0 480 376 | 4/1992 |
| EP | 0 837 905 | 4/1998 |
| EP | 0 876 406 | 11/1998 |
| EP | 1 054 927 | 11/2000 |
| EP | 1 084 162 | 3/2001 |
| EP | 1 093 658 | 4/2001 |
| EP | 1 187 876 | 3/2002 |
| WO | WO 95/11264 | 4/1995 |
| WO | WO 01/48029 | 7/2001 |
| WO | WO 2005/108454 | 11/2005 |

OTHER PUBLICATIONS

Ebner, K.; *Bimodal HDPE for Piping Systems and Further Applications*, Advances In Plastics Technology (1997); pp. 6/1-6/8.

Scheirs, John, et al.; *PE100 Resins for Pipe Applications: Continuing the Development into the 21st Century; Trends in Polymer Science* (1996), vol. 4, No. 12; pp. 408-415.

Berthold, J, et al.; *Advanced Polymerization Process for Tailor Made Pipe Resins; Plastics, Rubber and Composites Processing and Applications* (1996), vol. 25, No. 8; pp. 368-372.

* cited by examiner

*Primary Examiner*—Nathan M Nutter
(74) *Attorney, Agent, or Firm*—Leandro Arechederra, III

(57) ABSTRACT

Multimodal polyethylenes possessing a density from 0.940 to 0.965 g/cm$^3$, and an $I_{21}$ from 4 to 20 dg/min, and comprising a low molecular weight ethylene copolymer having a weight average molecular weight from 5,000 amu to 50,000 amu; and a high molecular weight ethylene copolymer having a weight average molecular weight from 60,000 amu to 800,000 amu, both components having a desirable balance of short chain branching making the multimodal polyethylene suitable for films, pipes, rotomolding applications and blow molding applications.

21 Claims, 5 Drawing Sheets

HIGH DENSITY POLYETHYLENE

FIELD OF THE INVENTION

The present invention relates to high density multimodal polyethylene compositions and having at least a low and a high molecular weight ethylene copolymer, and in particular, to high density multimodal polyethylenes having a branching frequency that allows the polyethylene to be useful in rotomolding and blow molding as well as pipe and film applications.

BACKGROUND OF THE INVENTION

Polyethylene compositions comprising at least two or more distinct molecular weight ethylene copolymers are known in the art. Such compositions are often used in articles such as films and pipes. Typically, the composition that is useful for films is not useful for pipes or blow molded or rotomolded products. What would be useful is a "multimodal" polyethylene that is useful for all of these applications.

It is known that the type and amount of side chain branching within the multimodal polyethylenes can influence the final properties of an article made therefrom. In particular, K. Ebner, *Bi-Modal HDPE for Piping Systems and Further Applications* in ADV. PLAST. TECHNOL. APT, INT. CONF. 1-8 (1997) and J. Scheirs et al., PE100 *Resins for Pipe Applications* in 4(12) TRENDS IN POLY. SCI. 408-415 (1996) finds that bimodal polyethylenes having the majority of the branching on the relatively "high" molecular weight fraction are most ideal. Typically, polyethylenes useful in pipes, such as disclosed in U.S. Pat. No. 6,867,278, comprise a low and a high molecular weight composition, wherein most or all of the branching is located on the high molecular weight fraction. What has not been disclosed are polyethylenes having a desirable amount of branching that would allow the composition to be multifunctional. The inventors have found such a composition, and in particular, have surprisingly found that certain multimodal compositions having a relatively large amount of branching on the low molecular weight ethylene copolymer are high versatile and useful in both film and pipe applications, as well as in blow molding and injection molding applications.

SUMMARY OF THE INVENTION

In one aspect the present invention is directed to a multimodal polyethylene possessing a density from 0.940 to 0.965 g/cm$^3$, and an I$_{21}$ from 4 to 20 dg/min, and comprising the following ethylene copolymers:

a low molecular weight ethylene copolymer having a weight average molecular weight from 5,000 amu to 50,000 amu and having a short chain branching index from 2.5 to 4.5; and a high molecular weight ethylene copolymer having a weight average molecular weight from 60,000 amu to 800,000 amu and having a short chain branching index from 1 to 2.5.

Another aspect of the present invention is directed to a multimodal polyethylene possessing a density from 0.940 to 0.965 g/cm$^3$, and an I21 from 4 to 20 dg/min, and comprising the following ethylene copolymers:

a low molecular weight ethylene copolymer having a weight average molecular weight from 5,000 amu to 50,000 amu; and a high molecular weight ethylene copolymer having a weight average molecular weight from 60,000 amu to 800,000 amu;

wherein the weight fraction of the high molecular weight ethylene copolymer relative to the entire multimodal composition ranges from 0.3 to 0.7; and wherein the ratio of the branching index of the low and high molecular weight ethylene copolymers ranges from 1.2 to 6.0.

These aspects of the invention and others can be combined with any number of embodiments as described herein.

DETAILED DESCRIPTION OF THE INVENTION

Figure 1:
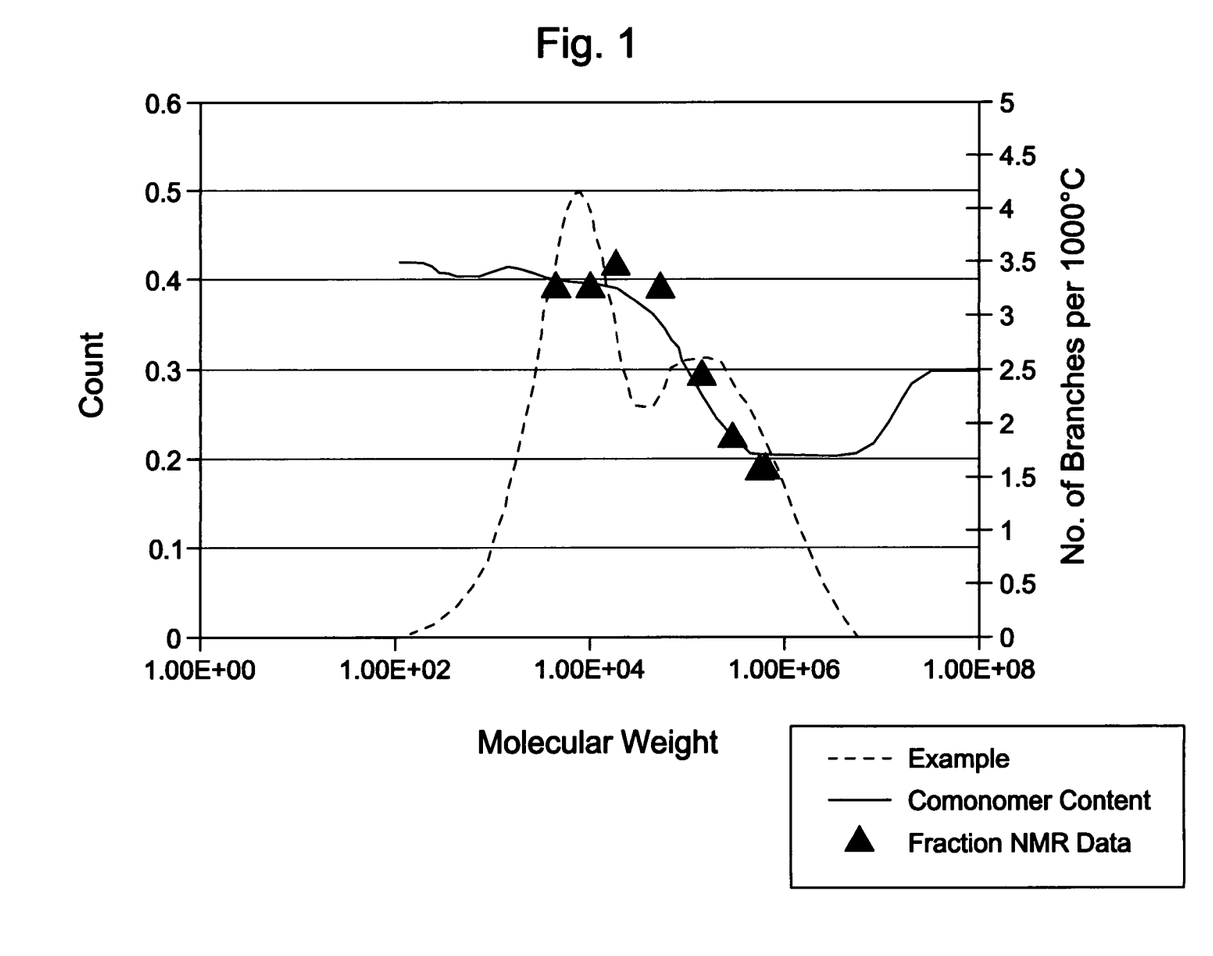
FIG. 1 is a graphical representation of GPC measurements and NMR measurements of polymer fractions of embodiments of the inventive multimodal polymers.
Figure 2:
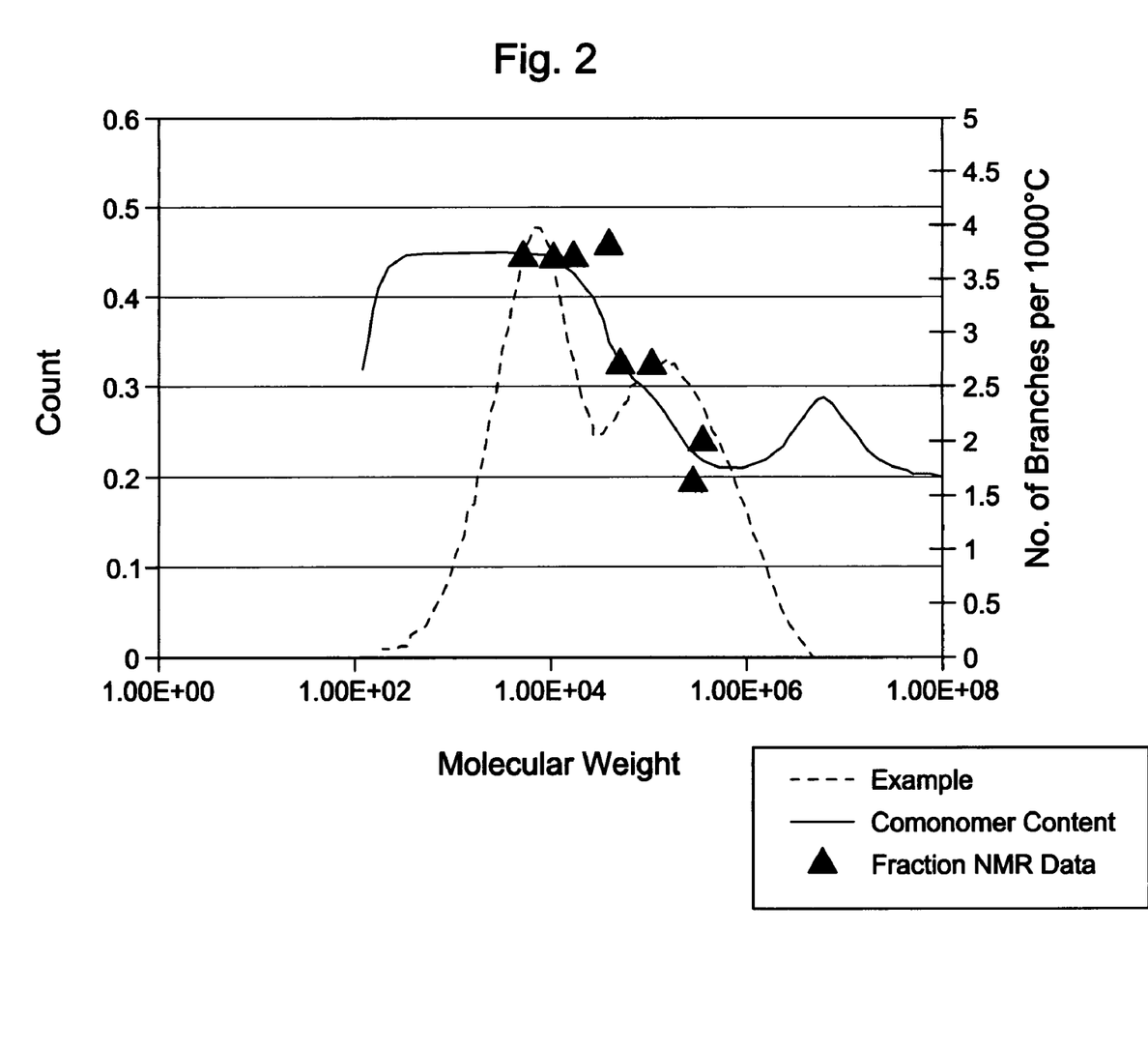
FIG. 2 is a graphical representation of GPC measurements and NMR measurements of polymer fractions of embodiments of the inventive multimodal polymers.
Figure 3:
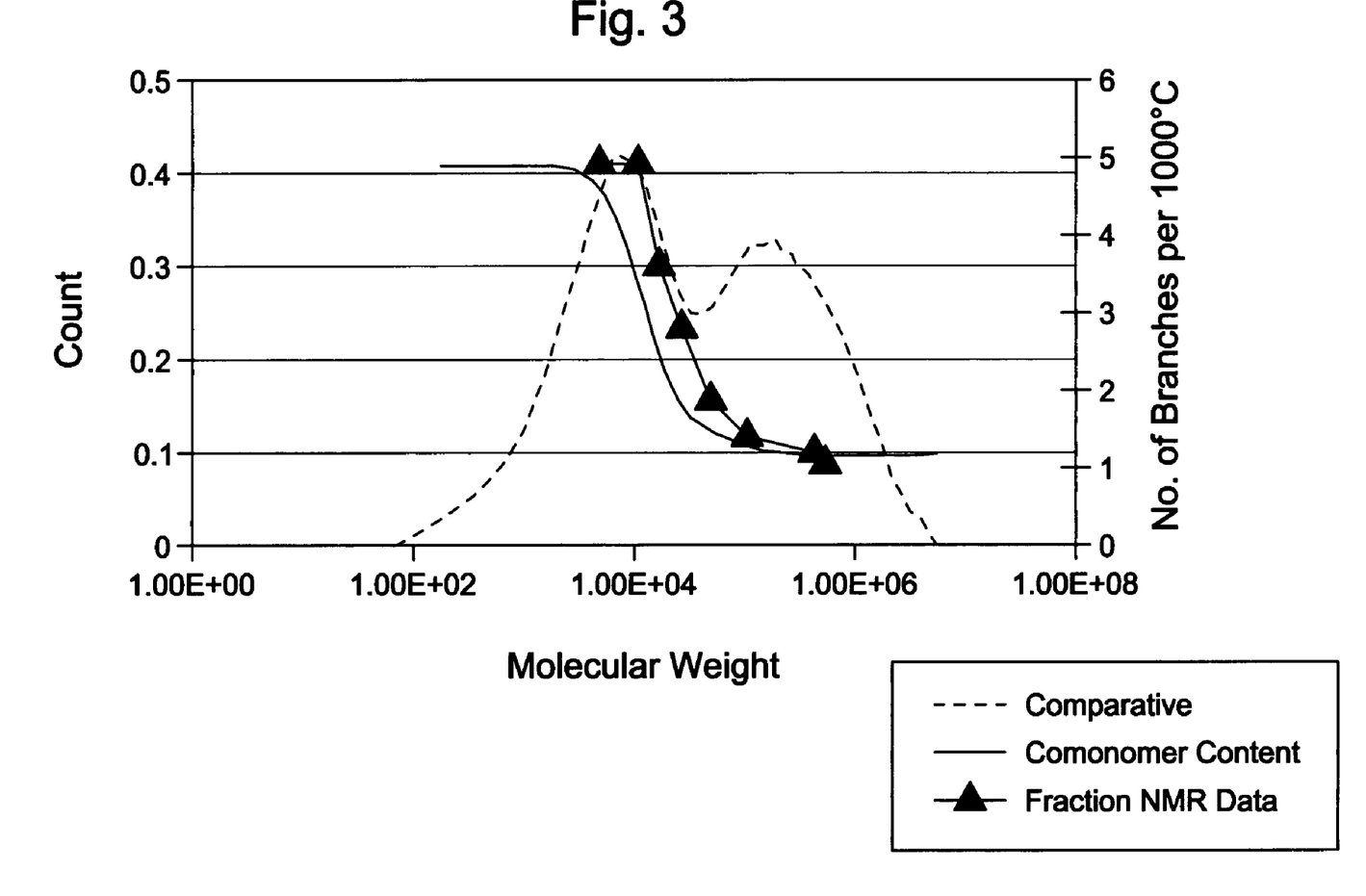
FIG. 3 is a graphical representation of GPC measurements and NMR measurements of polymer fractions of a "comparative" polymer.
Figure 4:
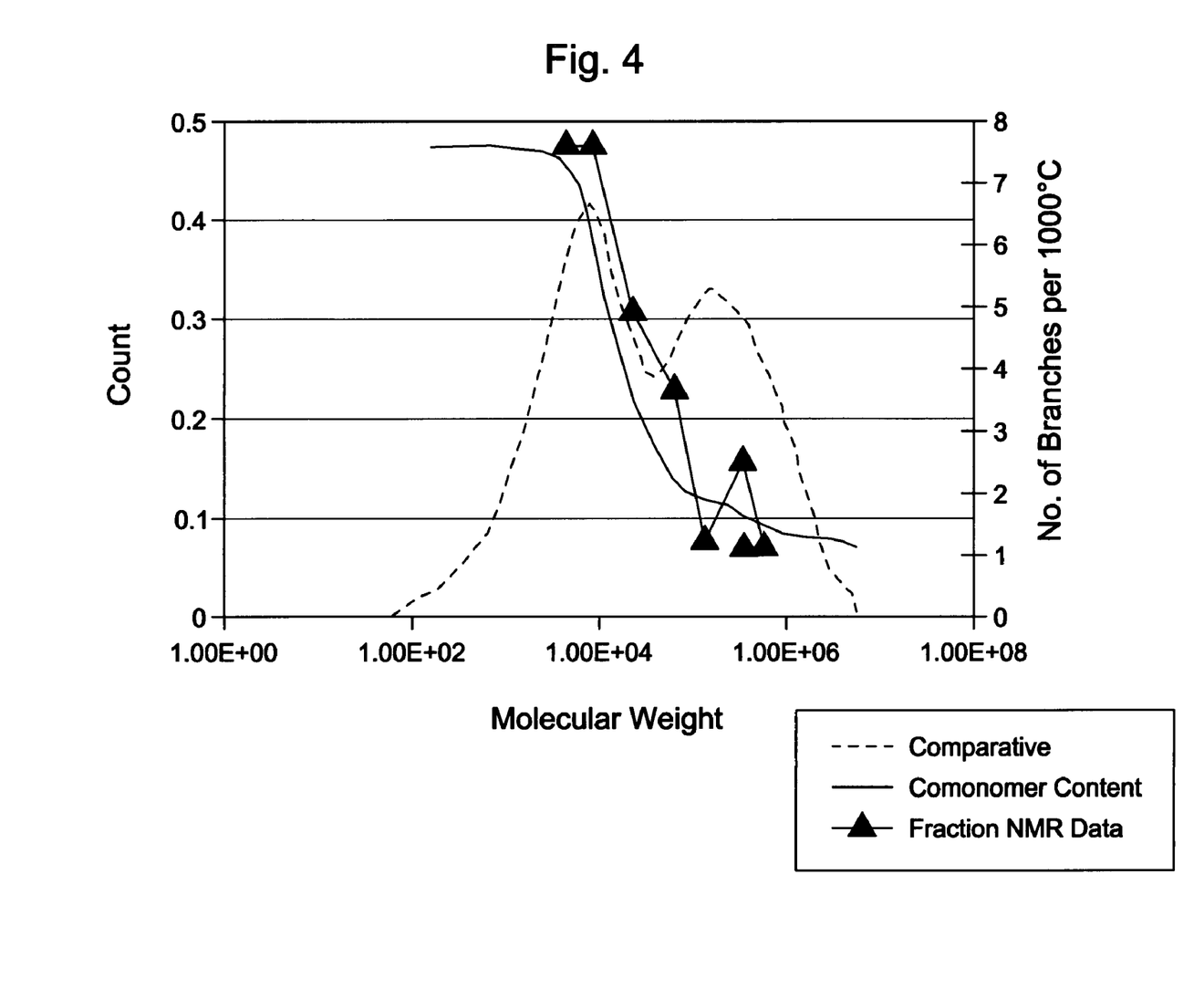
FIG. 4 is a graphical representation of GPC measurements and NMR measurements of polymer fractions of a "comparative" polymer.
Figure 5:
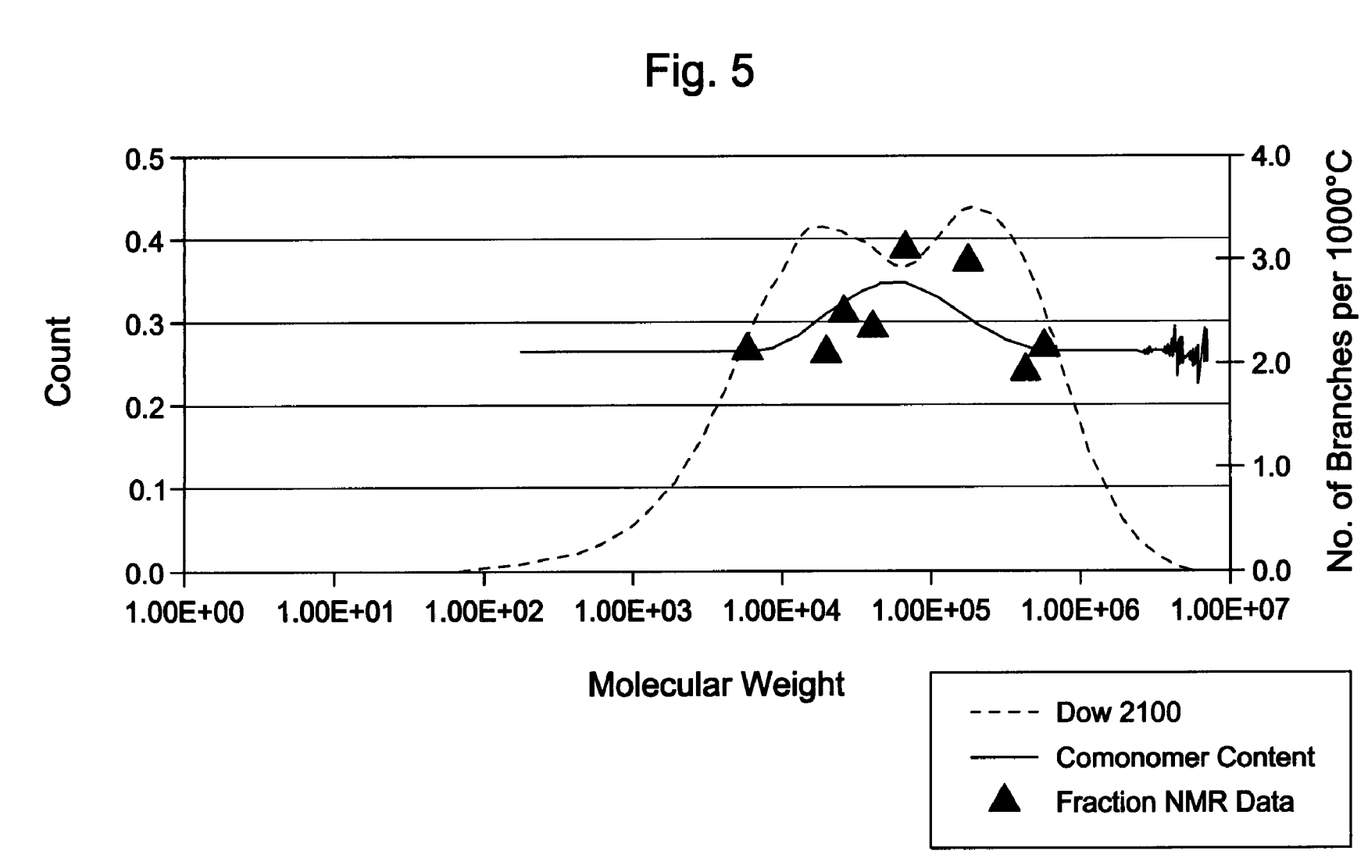
FIG. 5 is a graphical representation of GPC measurements and NMR measurements of polymer fractions of a Dow 2100 bimodal polymer.

As used herein, in reference to Periodic Table "Groups" of Elements, the "new" numbering scheme for the Periodic Table Groups are used as in the CRC Handbook of Chemistry and Physics (David R. Lide ed., CRC Press 81st ed. 2000).

As used herein, "short chain branching index" or "branching index" refers to the number of $C_2$ to $C_5$ side chain alkyl groups exist per 1000 backbone carbon atoms on the polyethylene fraction being measured or referred to. This value is determined by the method described in the "Examples" section herein.

As used herein, "multimodal polyethylene" refers to polyethylene copolymer compositions comprising at least one identifiable "low" molecular weight ethylene copolymer and one identifiable "high" molecular weight ethylene copolymer, those ethylene copolymers identifiable by techniques known in the art such as analytical gel permeation chromatography ("GPC"), an embodiment of which is described in the "Examples" section herein. The high and low molecular weight ethylene copolymers may be identified by deconvolution techniques known in the art to discern the two polyethylene copolymers from a broad or shouldered GPC curve of the multimodal polyethylene, and in another embodiment, the GPC curve of the multimodal polyethylene of the invention may display distinct peaks with a trough. In a preferred embodiment, the multimodal polyethylene described herein consists essentially of one low and one high molecular weight ethylene copolymer, thus "bimodal". The "multimodal polyethylene" is not limited by its method of production.

As used herein, an "ethylene copolymer" is a polyolefin comprising at least 60% ethylene derived units by weight of the entire polymer component. More preferably, an ethylene copolymer as used herein comprises ethylene derived units and α-olefins selected from the group consisting of $C_3$ to $C_{12}$ α-olefins and cyclic olefin derived units, wherein the ethylene copolymer comprises at least 50% or 80 wt % of ethylene derived units and from greater than a detectable level to 20 wt % α-olefin derived units, preferably from 1 to 10 wt % of α-olefin derived units. Most preferably, the α-olefin is selected from the group consisting of $C_4$ to $C_8$ α-olefins.

As used herein, the "low molecular weight ethylene copolymer" is an ethylene copolymer possessing a weight average molecular weight from 5,000 amu to 50,000 amu, and more preferably from 5,500 amu to 40,000 amu. In one embodiment, the low molecular weight ethylene copolymer possesses a short chain branching index from 2.5 to 4.5 and from 3 to 4 in a more preferred embodiment.

As used herein, the "high molecular weight ethylene copolymer" is an ethylene copolymer possessing a weight average molecular weight from 60,000 amu to 800,000 amu, and more preferably from 65,000 amu to 700,000 amu. In one embodiment, the high molecular weight ethylene copolymer possesses a short chain branching index from 1 to 2.5, and from 1.1 to 2.4 in a more preferred embodiment.

The weight fraction of the high molecular weight ethylene copolymer relative to the entire multimodal composition may be at any level depending on the properties that are desired in the multimodal polyethylene; in one embodiment the high molecular weight ethylene copolymer weight fraction ranges from 0.3 to 0.7 (30 to 70 wt % by weight of the total multimodal polyethylene); and from 0.4 to 0.6 in another particular embodiment, and ranges from 0.5 and 0.6 in yet another particular embodiment.

In one embodiment of the multimodal polyethylene, the ratio of the branching index of the low and high molecular weight ethylene copolymers ranges from 1.2 to 6.0, and from 1.5 to 5.0 in another embodiment, and from 1.8 to 4.5 in yet another embodiment.

In one embodiment, the multimodal polyethylene possesses a density (gradient density, ASTM D-792) from 0.940 to 0.965 g/cm³, and from 0.942 to 0.960 g/cm³ in another embodiment, wherein a desirable range of density can comprise any combination of any upper limit with any lower limit described herein. Further, in one embodiment, the multimodal polyethylene possesses an $I_{21}$ ($I_2$ as measured by ASTM-D-1238-F, 190° C./21.6 kg) from 4 to 20 dg/min, and from 5 to 16 dg/min in another embodiment, and from 6 to 12 dg/min in yet another embodiment, wherein a desirable range of $I_{21}$ can comprise any combination of any upper limit with any lower limit described herein. In another embodiment, the multimodal polyethylene described herein possesses an $I_5$ (ASTM-D-1238-F, 190° C./5.0 kg) of from 0.2 to 0.5 dg/min, and from 0.3 to 0.45 in another embodiment, and from 0.3 to 0.4 in yet another embodiment, wherein a desirable range of $I_5$ can comprise any combination of any upper limit with any lower limit described herein. The multimodal polyethylene described herein may comprise any combination of these features.

In one embodiment, the multimodal polyethylene possesses a weight average molecular weight to number average molecular weight ratio (molecular weight distribution) from 30 to 100, and from 30 to 90 in another embodiment, and from 35 to 80 in yet another embodiment, wherein a desirable range may comprise any combination of any upper limit with any lower limit described herein. Preferably, the molecular weight distribution is derived from GPC analysis as described herein.

The multimodal polyethylenes described herein may be made by any suitable technique known in the art such as by physical blending of at least one high and at least one low molecular weight ethylene copolymer, or by in-situ polymerization processes known in the art such as staged reactor processes, or in-situ polymerization in a single reactor. In one embodiment, the multimodal polyethylene is produced in a single continuous fluidized bed gas phase reactor.

In a particular embodiment, the multimodal polyethylene useful in the invention is made in a single continuous gas phase fluidized bed reactor as an in-situ blend of at least one high molecular weight ethylene copolymer and at least one low molecular weight ethylene copolymer. In one or more embodiments, the polymerization system can include a reactor body in fluid communication with one or more discharge tanks, surge tanks, and recycle compressors. In one embodiment, the reactor body includes a reaction zone within the reactor body in fluid communication with a velocity reduction zone, typically at the top of the reactor body and having a conical geometry with increasing diameter. The reaction zone can include a bed of growing polymer particles, formed polymer particles and catalyst particles fluidized by the continuous flow of polymerizable and modifying gaseous components in the form of make-up feed and recycle fluid through the reaction zone.

A feed stream can be directed to enter the cycle line before the blower but may also be at any point in the polymerization system including to the reactor fluid bed, the expanded section or to the cycle line before or after the cooler as depicted with alternative feed stream location. The term "feed stream" as used herein refers to a raw material, either gas phase or liquid phase, used in a polymerization process to produce a polymer product. For example, a feed stream may be any olefin monomer including substituted and unsubstituted alkenes having two to 12 carbon atoms, such as ethylene, propylene, 1-butene, 1-pentene, 4-methyl-1-pentene, 1-hexene, 1-octene, 1-decene, 1-dodecene, styrene, and derivatives thereof. The feed stream also includes non-olefinic gas such as nitrogen and hydrogen. The feeds may enter the reactor at multiple and different locations. For examples, monomers can be introduced into the polymerization zone in various ways including direct injection through a nozzle into the bed. The feed stream may further include one or more non-reactive alkanes that may be condensable in the polymerization process for removing the heat of reaction. Illustrative non-reactive alkanes include, but are not limited to, propane, butane, isobutane, pentane, isopentane, hexane, isomers thereof and derivatives thereof. Such operation is referred to in the art as "condensed mode" operation.

The fluidized bed has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor. To maintain a viable fluidized bed in the reaction zone, the superficial gas velocity through the bed must exceed the minimum flow required for fluidization. Preferably, the superficial gas velocity is at least two times the minimum flow velocity. Ordinarily, the superficial gas velocity does not exceed 5.0 ft/sec and usually no more than 2.5 ft/sec is sufficient.

In general, the height to diameter ratio of the reaction zone can vary in the range from 2:1 to 5:1. The range, of course, can vary to larger or smaller ratios and depends upon the desired production capacity. The cross-sectional area of the velocity reduction zone is typically within the range of 2 to 3 multiplied by the cross-sectional area of the reaction zone.

The velocity reduction zone has a larger inner diameter than the reaction zone. As the name suggests, the velocity reduction zone slows the velocity of the gas due to the increased cross sectional area. This reduction in gas velocity drops the entrained particles into the bed, allowing primarily only gas to flow from the reactor. That gas exiting the overhead of the reactor is the recycle gas stream.

The recycle stream is compressed in a compressor and then passed through a heat exchange zone where heat is removed before it is returned to the bed. The heat exchange zone is typically a heat exchanger which can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle stream is returned to the reactor. The cooled recycle stream absorbs the heat of reaction generated by the polymerization reaction.

Preferably, the recycle stream is returned to the reactor and to the fluidized bed through a gas distributor plate. A gas deflector is preferably installed at the inlet to the reactor to prevent contained polymer particles from settling out and agglomerating into a solid mass and to prevent liquid accumulation at the bottom of the reactor as well to facilitate easy transitions between processes which contain liquid in the cycle gas stream and those which do not and vice versa. An illustrative deflector suitable for this purpose is described in U.S. Pat. Nos. 4,933,415 and 6,627,713.

An activated precursor composition with or without an aluminum alkyl modifier (hereinafter collectively referred to as catalyst) is preferably stored for service in a catalyst reservoir under a blanket of a gas which is inert to the stored material, such as nitrogen or argon. Preferably, the catalyst reservoir is equipped with a feeder suitable to continuously feed the catalyst into the reactor. An illustrative catalyst reservoir is shown and described in U.S. Pat. No. 3,779,712, for example. A gas that is inert to the catalyst, such as nitrogen or argon, is preferably used to carry the catalyst into the bed. Preferably, the carrier gas is the same as the blanket gas used for storing the catalysts in the catalyst reservoir. In one embodiment the catalyst is a dry powder and the catalyst feeder comprises a rotating metering disk. In another embodiment the catalyst is provided as a slurry in mineral oil or liquid hydrocarbon or mixture such as for example propane, butane, isopentane, hexane, heptane or octane. An illustrative catalyst reservoir is shown and described in WO 2004094489. The catalyst slurry may be delivered to the reactor with a carrier fluid, such as, for example, nitrogen or argon or a liquid such as for example isopentane or other $C_3$ to $C_8$ alkane. It is possible to modify the catalyst during delivery to the reactor along the feed addition line with the aluminum alkyl modifiers, which are described elsewhere herein.

The catalyst is injected at a point into the bed where good mixing with polymer particles occurs. For example, the catalyst is injected into the bed at a point above the distributor plate. Injecting the catalyst at a point above the distribution plate provides satisfactory operation of a fluidized-bed polymerization reactor. Injection of the catalyst into the area below the distributor plate could cause polymerization to begin there and eventually cause plugging of the distributor plate. Injection directly into the fluidized bed aids in distributing the catalyst uniformly throughout the bed and tends to avoid the formation of localized spots of high catalyst concentration which can cause "hot spots" to form. An activator and/or modifier compound (e.g., an aluminum alkyl compound, a non-limiting illustrative example of which is triethylaluminum), can also be added to the reaction system either directly into the fluidized bed or downstream of the heat exchanger, in which case the modifier is fed into the recycle system from a dispenser.

The polymerization reaction is conducted substantially in the absence of catalyst poisons such as moisture, oxygen, carbon monoxide and acetylene. However, oxygen can be added back to the reactor at very low concentrations to alter the polymer structure and its product performance characteristics. Oxygen may be added at a concentration relative to the ethylene feed rate to the reactor of 10 to 600 ppbv, and more preferably 10 to 500 ppbv.

In order to achieve the desired density ranges in the copolymers it is necessary to copolymerize enough of the comonomers with ethylene to achieve a level of 0 to anywhere from 5 to 10 weight percent of the comonomer in the copolymer. The amount of comonomer needed to achieve this result will depend on the particular comonomer(s) being employed, the activation temperature of the catalyst and its formulation. The ratio of the comonomer to ethylene should be controlled to obtain the desired resin density of copolymer product.

A gas analyzer can be used to determine the composition of the recycle stream and the composition of the make-up feed stream and can be adjusted accordingly to maintain an essentially steady state gaseous composition within the reaction zone. The gas analyzer can be a conventional gas analyzer that determines the recycle stream composition to maintain the ratios of feed stream components. Such equipment is commercially available from a wide variety of sources. The gas analyzer may be positioned to receive gas from a sampling point located between the velocity reduction zone and heat exchanger.

The rate of polymer production in the bed depends on the rate of catalyst injection and the concentration of monomer(s) in the reaction zone. The production rate is conveniently controlled by adjusting the rate of catalyst injection. Since any change in the rate of catalyst injection will change the reaction rate and thus the rate at which heat is generated in the bed, the temperature of the recycle stream entering the reactor is adjusted to accommodate any change in the rate of heat generation. This ensures the maintenance of an essentially constant temperature in the bed. Complete instrumentation of both the fluidized bed and the recycle stream cooling system is, of course, useful to detect any temperature change in the bed so as to enable either the operator or a conventional automatic control system to make a suitable adjustment in the temperature of the recycle stream.

Under a given set of operating conditions, the fluidized bed is maintained at essentially a constant height by withdrawing a portion of the bed as product at the rate of formation of the particulate polymer product. Since the rate of heat generation is directly related to the rate of product formation, a measurement of the temperature rise of the fluid across the reactor (the difference between inlet fluid temperature and exit fluid temperature) is indicative of the rate of particulate polymer formation at a constant fluid velocity if no or negligible vaporizable liquid is present in the inlet fluid.

On discharge of particulate polymer product from gas phase fluidized bed reactor body, it is desirable and preferable to separate fluid from the product and to return the fluid to the recycle line. There are numerous ways known to the art to accomplish this separation. In one or more embodiments, fluid and product leave the reactor body and enter the product discharge tanks through valve, which may be a ball valve designed to have minimum restriction to flow when opened. Positioned above and below the product discharge tank are conventional valves. The valve allows passage of product into the product surge tanks. Another preferred product discharge system which may be alternatively employed is that disclosed and claimed in U.S. Pat. No. 4,621,952. Such a system employs at least one (parallel) pair of tanks comprising a settling tank and a transfer tank arranged in series and having the separated gas phase returned from the top of the settling tank to a point in the reactor near the top of the fluidized bed.

The fluidized-bed reactor is equipped with an adequate venting system to allow venting the bed during start up and shut down. The reactor does not require the use of stirring and/or wall scraping. The recycle line and the elements therein should be smooth-surfaced and devoid of unnecessary obstructions so as not to impede the flow of recycle fluid or entrained particles.

The conditions for polymerizations vary depending upon the monomers, catalysts and equipment availability. The specific conditions are known or readily derivable by those skilled in the art. For example, the temperatures are within the range from −10° C. to 120° C., often 15° C. to 110° C. Pressures may vary within the range from 0.1 bar to 100 bar, more preferably from 5 bar to 50 bar, for example. Additional details of polymerization can be found in U.S. Pat. No. 6,627,713.

The multimodal polyethylene, regardless of how it is produced, can be blended with certain additives as is known in the art. Conventional additives, which can be introduced into the polymer, are exemplified by antioxidants, ultraviolet absorbers, antistatic agents, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and anti-blocking agents. Aside from the fillers, the additives can be present in the blend in amounts of 0.1 to 10 parts by weight of additive for each 100 parts by weight of polymer blend.

In a particular embodiment, the multimodal polyethylene is produced by contacting ethylene and $C_3$-$C_8$ α-olefins with a bimetallic catalyst composition comprising a metallocene, and a non-metallocene catalyst. Metallocenes are well known in the art and include organometallic compounds comprising at least one cyclopentadienyl ligand or ligands isolobal to cyclopentadienyl and a Group 3-8 or Lanthanide metal. Preferred metallocenes include bis-cyclopentadienyl complexes with Group 4 metals, most preferably hafnium and zirconium; wherein the cyclopentadienyl is selected from cyclopentadienyl, indenyl, tetrahydroindenyl, and substituted versions thereof, most preferably unsymmetrically substituted. By "unsymmetrically substituted, what is meant is that there are a different number, type, or both, of substituent groups on each of the cyclopentadienyl ligands or ligands isolobal to cyclopentadienyl. In a most preferred embodiment, the metallocene is an unsymmetrically substituted bis(cyclopentadienyl)zirconocene dihalide or dialkyl, wherein the substituent groups are selected from $C_1$ to $C_5$ alkyls.

As used herein, the term "substituted" means that the group following that term possesses at least one moiety in place of one or more hydrogens (bound to a carbon atom) in any position, the moieties selected from such groups as halogen radicals (esp., Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbamoyl radicals, alkyl- and dialkyl-carbamoyl radicals, acyloxy radicals, acylamino radicals, arylamino radicals, and combinations thereof.

By "non-metallocene" catalyst, what is meant is any compound capable of polymerizing olefins to form ethylene copolymers as described herein, non-limiting examples of which include chromium oxide-based catalysts, chromocene catalysts, titanium-based Ziegler-Natta catalysts, with or without magnesium halides or alkyl magnesium compounds, vanadium-based catalyst compounds, and amine/imide-coordination compounds of Group 3-10 metals. These types of catalyst compositions are well known in the art for producing polyethylenes and other polyolefins.

Preferable embodiments of bimetallic catalyst compositions also include a support material such as an inorganic oxide or polymeric species. Preferred supports include silica and aluminum. Preferably embodiments of the catalyst compositions also include at least one activator. Activators are well known in the art and include such compounds as aluminoxanes, aluminum alkyls, alkylborane, alkylborates, arylboranes and arylborate compounds, and mixtures thereof.

The multimodal polyethylenes described herein are useful in making pipes, films, blow molded articles and rotomolded articles. Methods for producing pipes from polyethylenes are well known in the art. Any size extruder suitable for extruding the multimodal polyethylene for forming a pipe can be used, in one embodiment a smooth bore or grooved feed extruder is used, and either twin- or single-screw extruders are suitable, a length:diameter (L/D) ratio ranging from 1:20 to 1:100 in one embodiment, preferably ranging from 1:25 to 1:40, and the diameter of the extruder screw having any desirable size, ranging for example from 30 mm to 500 mm, preferably from 50 mm to 100 mm. Extruders suitable for extruding the pipe compositions described herein are described further in, for example, SCREW EXTRUSION, SCIENCE AND TECHNOLOGY (James L. White and Helmut Potente, eds., Hanser, 2003). In one embodiment, a pipe made from the multimodal polyethylene described herein possesses a PENT (ASTM D F1473-01, 3.0 MPa and 80° C.) value of at least 150.

In one embodiment, the multimodal polyethylene is formed into films such as described in the FILM EXTRUSION MANUAL, PROCESS, MATERIALS, PROPERTIES (TAPPI, 1992). Even more particularly, the films are blown films, the process for which is described generally in FILM EXTRUSION MANUAL, PROCESS, MATERIALS, PROPERTIES pp. 16-29, for example. Any extruder suitable for extrusion of a LLDPE (density between 0.91 and 0.925 $g/cm^3$) or HDPE (density greater than 0.940 $g/cm^3$) operating under any desirable conditions for the polyethylene compositions described herein can be used to produce the films. Such extruders are known to those skilled in the art. Such extruders include those having screw diameters ranging from 30 to 150 mm in one embodiment, and from 35 to 120 mm in another embodiment, and having an output from 100 to 1,500 lbs/hr in one embodiment, and from 200 to 1,000 lbs/hr in another embodiment. In one embodiment, a grooved feed extruder is used. The extruder may possess an L/D ratio from 80:1 to 2:1 in one embodiment, and from 60:1 to 6:1 in another embodiment, and from 40:1 to 12:1 in yet another embodiment, and from 30:1 to 16:1 in yet another embodiment.

A mono or multi-layer die can be used. In one embodiment a 50 to 200 mm monolayer die is used, and a 90 to 160 mm monolayer die in another embodiment, and a 100 to 140 mm monolayer die in yet another embodiment, the die having a nominal die gap ranging from 0.6 to 3 mm in one embodiment, and from 0.8 to 2 mm in another embodiment, and from 1 to 1.8 mm in yet another embodiment, wherein a desirable die can be described by any combination of any embodiment described herein. In a particular embodiment, the advantageous specific throughputs claimed herein are maintained in a 50 mm grooved feed extruder with an L/D of 21:1 in a particular embodiment.

The temperature across the zones of the extruder, neck and adapter of the extruder ranges from 150° C. to 230° C. in one embodiment, and from 160° C. to 210° C. in another embodiment, and from 170° C. to 190° C. in yet another embodiment. The temperature across the die ranges from 160° C. to 250° C. in one embodiment, and from 170° C. to 230° C. in another embodiment, and from 180° C. to 210° C. in yet another embodiment.

In one embodiment, a film made from the multimodal polyethylene of at least 12 μm in thickness possesses a dart drop of at least 200 grams; the film having been made at a 4:1 BUR on a 50 mm (L/D=18) grooved feed grooved feed extruder with 100 mm die and 1.0 mm die gap. In one embodiment, the extruder is an Alpine extruder or equivalent to an Alpine extruder.

Blowing molding is the primary method to form hollow plastic objects such as soda bottles. The process includes clamping the ends of a softened tube of polymers which can be either extruded or reheated, inflating the polymer against the mold walls with a blow pin, and cooling the product by conduction or evaporation of volatile fluids in the container. There are three general types of blow molding: extrusion blow molding, injection blow molding, and stretch blow molding. Extrusion blow molding is usually used to make items of weight greater than 12 oz. such as containers for food, laundry, or waste. Injection blow molding is used to achieve very accurate wall thickness, high-quality neck finish, and to process polymers that can not be extruded. Usual applications include pharmaceutical products, cosmetic products, and single serving liquor bottles that weight less than 12 oz. Stretch blow molding is only used for difficult to blow crystalline and crystallizable polymers such as polypropylene and polyethylene terephthalate.

The rotational molding process is also well known in the art. Rotational molding is a process also known as rotomolding or rotational casting is used for the manufacture of hollow plastics including large storage tanks, typically parts that are larger or greater in volume than those produced in the blow molding process. It involves placing a thermoplastic powder such as a polyolefin into a mold, heating the mold in an oven while rotating the mold into perpendicular axes simultaneously.

Thus, the compositions and processes of the present invention can be described alternately by any of the embodiments disclosed herein, or a combination of any of the embodiments described herein. Embodiments of the invention, while not meant to be limiting by, may be better understood by reference to the following non-limiting examples.

EXAMPLES

Synthesis of Bimetallic Catalyst Composition

A supported bimetallic catalyst composition was used to produce the "inventive" example polyethylenes. Non-limiting embodiments of "inventive" examples as represented in the tables reflect separate runs of using the same catalyst under varying reactor conditions. This bimetallic catalyst was injected directly into a fluidized bed using purified nitrogen to produce the polyethylene. Catalyst injection rates were adjusted to maintain approximately constant production rate. In each run, the catalyst comprised a silica dehydrated at 875° C., methylalumoxane, a (tetramethylcyclopentadienyl)(n-propylcyclopentadienyl)zirconium difluoride metallocene and a Ziegler-Natta catalyst compound comprising $TiCl_4$ and an alkylmagnesium compound.

More specifically, an example of the method of making the bimetallic catalyst used in the "inventive" examples is as follows: silica support material, Davison SYLOPOL 955 Silica or Ineos ES757 can be used. The silicas are dehydrated at a temperature of 875° C. Then, for each sample, 500 grams of the respective dehydrated silica is added into a 5-liter, 3-neck round bottom flask enclosed in an $N_2$ glove box. Anhydrous hexane (2500 ml) is then added into the flask, making a silica/hexane slurry. The slurry is heated to a temperature of about 54° C. while under constant stirring, and 380 grams of a 15 wt % solution of dibutyl magnesium is added to the slurry over a period of about 20 minutes. The slurry is then allowed to stand for an additional 30 minutes. Butanol (27.4 grams) is diluted to volume with hexane in a 125 ml volumetric flask. The entire 125 ml of diluted butanol solution is added dropwise into the flask containing the slurry, and then the slurry is held at a temperature of about 54° C. for 30 minutes while under constant agitation. The amount of butanol may be varied, depending upon the desired concentrations. Titanium tetrachloride (41.0 grams) is diluted to volume with hexane in a 125 ml volumetric flask. The entire 125 ml of diluted titanium tetrachloride solution is then added dropwise into the flask containing the slurry. Following the addition of the solution, the slurry is allowed to stand for about 30 minutes at a temperature of about 54° C. The slurry is then allowed to cool to ambient temperature.

The metallocene catalyst compound is then added to the sample of titanium tetrachloride-treated dehydrated silica. First, 673 grams of a 30 wt % solution of methylaluminoxane (MAO) in toluene is added to a new flask in an $N_2$ glove box. About 13.72 grams of the metallocene bis-n-butyl-cyclopentadienyl zirconium difluoride is added into the MAO solution, and the mixture is stirred until all of the solids are dissolved. Next, the MAO/Metallocene mixture is slowly added into the flask containing the previously prepared titanium reaction slurry over a period of about one hour. Toluene (50 ml) is used to wash the residual MAO/Metallocene mixture remaining in the flask into the flask containing the reaction slurry. The Al/Zr molar ratio (Al from MAO) may range from about 90 to 110. The Ti/Zr molar ratio is about 6. Each resulting mixture that included the respective bimetallic catalyst sample is then held at ambient temperature for a period of one hour. Afterward, each mixture is dried using a rotary vaporizer, followed by removing most of the hexanes using a vacuum pressure of 21 mmHg at a temperature of 52° C. The high boiling point toluene was subsequently removed using a vacuum pressure of 28 mmHg at a temperature of 70° C. The final dried bimetallic catalyst appears brown in color as a free flowing solid. Each sample is used in a separate polymerization run in a gas phase reactor, under the conditions identified in the Tables to form a polyethylene polymer composition.

The "comparative" example polyethylenes were also produced using a supported bimetallic catalyst produced similarly to the bimetallic catalyst above, except that the metallocene compound used was a bis(n-butylcyclopentadienyl) zirconium difluoride metallocene. The bimetallic catalyst and comparative multimodal polyethylenes made therefrom are similar to that described in U.S. Pat. No. 6,878,454. Different "comparative examples" as represented in the tables reflect separate runs of using the same or similar catalyst under varying reactor conditions.

Gas Phase Polymerization Conditions

The "inventive" and "comparative" polyethylenes were produced in a single continuous fluidized bed gas phase reactor. The fluidized bed of the reactor was made up of polyethylene granules. The reactor was passivated with an alkylaluminum, preferably trimethylaluminum. The same or similar alkylaluminum was also added to the reactor continuously during the production of polymer. During each run, the gaseous feed streams of ethylene and hydrogen were introduced before the reactor bed into a recycle gas line. The injections were downstream of the recycle line heat exchanger and compressor. Liquid 1-hexene comonomer was introduced before the reactor bed. The control agent (e.g., water, isopropyl alcohol, etc), if any, that influenced resin split and helped control fouling, especially bottom plate fouling, was added before the reactor bed into a recycle gas line in gaseous or liquid form. The individual flows of alkylaluminum (trimethylaluminum, "TMA"), ethylene, hydrogen and 1-hexene comonomer were controlled to maintain target reactor conditions, as identified in each example. The concentrations of gases were measured by an on-line chromatograph. Other conditions are as stated in the tables below.

Film Extrusion Conditions

Resin samples in both Trials were compounded with additives and formed into pellets and extruded into films on a 50 mm Alpine line with a 18:1 L/D, 1.0 mm die gap, 100 mm die, grooved feed extruder, Model Number HS 50 R/HM-AV 12-WS 12. The zone temperature settings were as follows:

Barrel 1, 395° F.
Barrel 2, 400° F.
Block Adapter, 400° F.
Bottom Adapter, 400° F.
Vertical Adapter, 410° F.
Die Bottom, 410° F.
Die Middle, 410° F.
Die top, 410° F.

PENT Testing

Pellets of the resins were produced, pressed them into plaques and performed a PENT test according to ASTM D F1473-01 in order to estimate the performance of pipes made from the inventive polyethylenes. In particular, resin was formed into pellets as noted in the bottom of the tables. Pent Test method ASTM D F1473-01 (PENT) performed at 3.0 MPa and 80° C.; a precisely pressed and machined bar of the polyethylene sample was immersed in the stress cracking fluid and placed under a tensile load of 3.0 MPa. Temperature is held constant at 80° C. and the time to failure is measured.

TABLE 1

Trial 1 reactor conditions, resin properties and film properties therefrom.

| Description | | Comp. example | Comp. example | Comp. example | Inventive example 1 | Inventive example 2 | Inventive example 3 |
|---|---|---|---|---|---|---|---|
| Polymerization conditions | | | | | | | |
| Reactor Temperature | ° C. | 95 | 101 | 95 | 95 | 95 | 95 |
| Reactor Pressure | psig | 299 | 299 | 299 | 296 | 297 | 297 |
| Ethylene Partial Pressure | psia | 157 | 204.51 | 157.32 | 195.48 | 199.85 | 190 |
| Hexene/Ethylene Flow Ratio | kg/kg | 0.025 | 0.020 | 0.020 | 0.040 | 0.050 | 0.030 |
| Hexene/Ethylene Molar Ratio | mol/mol | 0.011 | 0.010 | 0.010 | 0.025 | 0.028 | 0.008 |
| TMA/Ethylene | ppmw | 100 | 125 | 125 | 101 | 99 | 96 |
| $H_2O$/Ethylene | ppmw | 19.0 | 22.2 | 22.5 | 4.9 | 2.9 | 11.6 |
| Isopentane | Mol % | 0.0% | 0.1% | 0.0% | 0.3% | 0.3% | 5.5% |
| Hydrogen/Ethylene | Mol/mol | 0.107 | 0.112 | 0.063 | 0.090 | 0.090 | 0.114 |
| Polyethylene Properties | | | | | | | |
| ASTM D1238 190/2.16 ($I_{21}$) | dg/min | 0.06 | 0.0838 | 0.0454 | 0.072 | 0.052 | 0.06 |
| ASTM D1238 190/21.60 ($I_{21}$) | dg/min | 7.49 | 6.136 | 4.49 | 9.25 | 6.84 | 6.2 |
| Density (1) | g/cm³ | 0.949 | 0.949 | 0.946 | 0.950 | 0.948 | 0.948 |
| ASTM D F1473-01 (PENT) (3.0 Mpa/80° C.) (2) | HRs | 6.3 | 8 | 44 | 40 | 330 | 196 |
| Film production and properties | | | | | | | |
| RATE | | 47.7 | 102 | 97 | 103 | 102 | 96 |
| FLHR (3) | | 9.1 | 9.1 | 9.1 | 9.1 | 9.1 | 11.2 |
| AVG GAUGE | | 1 | 1 | 1 | 1 | 1 | 1 |
| BUR (4) | | 4 | 4 | 4 | 4 | 4 | 4 |
| DART DROP IMPACT F50, ASTM D1709-01 | g | 206 | 284 | 404 | 221 | 264 | 203 |
| ELMENDORF TEAR, ASTM D-1922-00 | | | | | | | |
| Machine Direction | g/μm | 3.18 | 1.25 | 1.19 | 0.87 | 1.15 | 0.69 |
| Transverse Direction | g/μm | 8.62 | 2.62 | 7.85 | 12.84 | 8.36 | 10.61 |

(1) Procedure ASTM D4703-00 was used for molding plaques, while ASTM D-1505-98 was used for determining the density TABLE 1-continued Trial 1 reactor conditions, resin properties and film properties therefrom.

| Description | Comp. example | Comp. example | Comp. example | Inventive example 1 | Inventive example 2 | Inventive example 3 |
|---|---|---|---|---|---|---|

(2) Test performed at 3.0 MPa and 80° C.
(3) Frost line height ratio, defined as the ratio of the frost line height of the largest bubble diameter to the diameter of the die
(4) Blow up ratio, defined as the ratio of the largest bubble diameter to the diameter of the die

TABLE 2

Analytical PENT Data.

| example | $I_{21}$ dg/min | Density g/cm$^3$ | PENT 3.0 MPa F50, hours |
|---|---|---|---|
| comparative | 4.255 | 0.9476 | 74 |
| comparative | 4.255 | 0.9495 | 29 |
| comparative | 4.27 | 0.9458 | 46 |
| comparative | 4.49 | 0.9463 | 44 |
| comparative | 4.877 | 0.9475 | 18 |
| comparative | 4.877 | 0.9477 | 12 |
| comparative | 4.9 | 0.9465 | 35 |
| comparative | 4.949 | 0.9467 | 23 |
| comparative | 5.85 | 0.948 | 13 |
| comparative | 6.136 | 0.949 | 8 |
| inventive | 6.2 | 0.948 | 196 |
| inventive | 6.84 | 0.9479 | 330 |
| inventive | 9.25 | 0.9499 | 40 |

TABLE 3

Trial 2 reactor conditions.

| Description | | Inventive Example 3 | Inventive Example 4 | Comparative Example |
|---|---|---|---|---|
| Reactor Temperature | ° C. | 95 | 95 | 95 |
| Reactor Pressure | psig | 297 | 297 | 299 |
| Ethylene Partial Pressure | psia | 190 | 184 | 157 |
| Hexene/Ethylene Flow Ratio | lb/lb Ratio | 0.030 | 0.043 | 0.025 |
| Hexene/Ethylene Molar Ratio | Mol ratio | 0.008 | 0.022 | 0.0112 |
| TMA | ppm | 96 | 110 | 100 |
| H$_2$O/Ethylene | ppm | 11.6 | 11.47 | 19 |
| Isopentane | Mol % | 5.54% | 5.36% | 0% |
| Hydrogen/Ethylene | ppm/mol % | 114 | 99 | 107 |
| Lab Productivity | lb/lb | 3200 | 4400 | 2900$^2$ |

TABLE 4

Trial 2 Film production results.

| Description | | Inventive Example[1] | Inventive Example[1] | Comparative Example[2] |
|---|---|---|---|---|
| ASTM D1238 190/2.16 ($I_2$) | dg/min | 0.077 | 0.105 | 0.06 |
| ASTM D1238 190/5.0 ($I_5$) | dg/min | 0.331 | 0.397 | 0.277 |
| ASTM D1238 190/21.60 ($I_{21}$) | dg/min | 7.23 | 7.53 | 7.49 |
| Density (3) | g/ml | 0.953 | | 0.950 | 0.949 |
| RATE | kg/hr | 46 | 46 | 45 | 45 | 47.7 |
| FLHR[4] | | 11.2 | 10.2 | 11.2 | 12.2 | 9.1 |
| AVG GAUGE | μm | 25.4 | 12.7 | 25.4 | 12.7 | 25.4 |
| BUR[5] | | 4 | 4 | 4 | 4 | 4 |
| DART DROP IMPACT F50, ASTM D1709-01 | g | 203 | 209 | 224 | 212 | 206 |
| ELMENDORF TEAR, ASTM D-1922-00 | | | | | | |
| Machine Direction | g/μm | 0.69 | 1.22 | 0.96 | 0.95 | 3.18 |
| Transverse Direction | g/μm | 10.61 | 2.66 | 10.20 | 4.84 | 8.62 |

[1] Granular resins were compounded on a ZSK-30 with an additive package of 1500 ppm Irganox 1010, 1500 ppm Irgafos 168 and 1500 ppm ZnSt
[2] Granular resin compounded on ZSK-57 with additive package of 200 ppm Irgafos 168, 800 ppm Irganox 1010, 1000 ppm ZnSt and 200 ppm Carbowax
[3] Procedure ASTM D4703-00 was used for molding plaques, while ASTM D-1505-98 was used for determining the density
[4] Frost line height ratio, defined as the ratio of the frost line height of the largest bubble diameter to the diameter of the die
[5] Blow up ratio, defined as the ratio of the largest bubble diameter to the diameter of the die

TABLE 5

Trial 2 Plaques

| Description | | Inventive Example[1] | Comparative Example[3] |
|---|---|---|---|
| ASTM D1238 190/2.16 ($I_2$) | dg/min | 0.09 | 0.06 |
| ASTM D1238 190/21.60 ($I_{21}$) | dg/min | 6.2 | 7.49 |
| Density[4] | g/cm$^3$ | 0.948 | 0.949 |
| ASTM F1473-01 (PENT) (3.0 Mpa/80° C.)[5] | | 196 | 6.3 |

[1] Compounded on ZSK-30 with 1500 Irgafos-l0l0, 1500 Irganox-168
[2] Compounded on ZSK-30 with 1500 Irgafos-l0l0, 1500 Irganox-168, 1000 ppm ZnSt
[3] Compounded Prodex 1000 ppm Irganox 1010, 2000 ppm Irgafox-168
[4] Procedure ASTM D1928-00 was used for molding plaques, while ASTM D-792 was used for determining the density.
[5] Test performed at 3.0 MPa and 80° C.

Branching Index

The inventors have found that multimodal polyethylenes having a desirable branching index possesses properties that make the polyethylene highly versatile in film, pipe, roto-molded and blow molding products. In particular, it has been found that multimodal polyethylenes having at least one relatively low molecular weight fraction and one relatively high molecular weight fraction, each having a certain branching index, is desirable. Table 6 below describes this characteristic for the inventive, comparative (as described above) and a "comparative" Dow 2100 resin. The Dow 2100 resin is a high density (0.949 g/cm$^3$) bimodal polyethylene, I$_{21}$ of 9 dg/min, produced in tandem reactors. The embodiments described are meant to be non-limiting examples of how such multimodal polyethylenes can be produced.

The branching index is the ratio of number of branches per 1000 carbon atoms in the polymer backbone. It is determined herein, as reported in Table 6, by separating a single sample into five to seven different molecular weight fractions (by solvent fractionation), then measuring the branching of each molecular weight by NMR. For a given sample this generates the number of branches per 1000 carbons as a function of molecular weight. The branching frequency can then be estimated for each ethylene copolymer. The "branching index" as described herein is a number estimated by any technique known in the art, preferably as described, to within ±15% or less.

More particularly, the branching index was determined by a technique adapted from *W. Holtrup*, 178 MAKROMOL. CHEM. 2335 (1977). In order to receive narrow molecular weight distribution fractions successive solution fractionation was carried out by dynamic direct extraction according to *Holtrup*. In a typical example, about 1 g of polymer sample were placed in a 180 mL sample reactor and 8 fractions were obtained at 130° C. by variation of the volumetric ratios of xylene/ethylene glycol monobutyl ether mixtures ("solvent/non-solvent"). Mixtures containing 65, 60, 55, 50, 43, 40 and 37% of solvent were used. Solvent and non-solvent were stabilized with about 6 g 2,6-di-tert-butyl-4-methyl phenol per 4 L solvent. The obtained fractions were precipitated with excess acetone, filtered and dried under vacuum. The branching was then measured using $^1$H NMR. The solvent in each case was mixed well with the polymer at 130° C., then cooled and then heated again, followed by centrifugation to separate out the insoluble fraction(s), followed by separating out the precipitate and successively re-solubilizing this fraction in solvents having a higher amount of the stronger diluent, in this case xylene. This technique can be carried out for other multimodal polyethylenes, produced by any means, as outlined above, with variations in the solvent mixtures as determined by one skilled in the art, taking into account the properties of the polyethylene being tested.

GPC. The traces shown in the Figures, Mw/Mn, the Mw (weight average molecular weight) and Mn (number average molecular weight) values, and % HMW ethylene copolymer, etc. are determined from gel permeation chromatography measurements using crosslinked polystyrene columns; pore size sequence: 1 column less than 1000 Å, 3 columns of mixed 5×10(7) Å; 1,2,4-trichlorobenzene solvent at 145° C. with refractive index detection. The GPC data was deconvoluted into high and low molecular weight ethylene copolymers by use of a "Wesslau model", wherein the β term was restrained for the low molecular weight peak to 1.4, as described by E. Broyer & R. F. Abbott, *Analysis of molecular weight distribution using multiethylene copolymer models*, ACS SYMP. SER. (1982), 197 (COMPUT. APPL. APPL. POLYM. SCI.), 45-64.

TABLE 6

Branching Properties

| Polyethylene | LMW fraction Branching index | HMW fraction Branching index | Ratio LMW/HMW |
|---|---|---|---|
| Inventive | 3.4-3.8 | 1.6-1.9 | 2-2.1 |
| Comparative | 5-7.6 | 1-1.2 | 5-6.2 |
| Dow 2100 | 2-2.3 | 2.2-3.3 | 0.61-1.04 |

1. One aspect of the invention is to a multimodal polyethylene possessing a density from 0.940 to 0.965 g/cm$^3$, and an I$_{21}$ from 4 to 20 dg/min, and comprising the following ethylene copolymers: (a) a low molecular weight ethylene copolymer having a weight average molecular weight from 5,000 amu to 50,000 amu and having a short chain branching index from 2.5 to 4.5; and (b) a high molecular weight ethylene copolymer having a weight average molecular weight from 60,000 amu to 800,000 amu and having a short chain branching index from 1 to 2.5.

2. The multimodal polyethylene according to embodiment 1, wherein the ratio of the branching index of the low and high molecular weight fraction is in the range of 1.5 to 4.5.

3. The multimodal polyethylene according to any of the preceding embodiments 1-2, wherein the low molecular weight ethylene copolymer has a short chain branching index from 3 to 4.

4. The multimodal polyethylene according to any of the preceding embodiments 1-3, wherein the molecular weight distribution of the polyethylene ranges from 30 to 100.

5. The multimodal polyethylene according to any of the preceding embodiments 1-4, wherein the weight fraction of the high molecular weight ethylene copolymer ranges from 0.3 to 0.7.

6. The multimodal polyethylene according to any of the preceding embodiments 1-5, wherein the polyethylene is produced in a single continuous fluidized bed gas phase reactor.

7. The multimodal polyethylene according to the preceding embodiments 5, wherein the polyethylene is produced by contacting ethylene and a C$_3$-C$_8$ α-olefin with a bimetallic catalyst composition comprising a metallocene and a non-metallocene catalyst.

8. The multimodal polyethylene according to the preceding embodiment 7, wherein the metallocene is a bis-cyclopentadienyl complex of a Group 4 metal; wherein the cyclopentadienyl is selected from the group consisting of cyclopentadienyl, indenyl, tetrahydroindenyl, and substituted versions thereof.

9. The multimodal polyethylene according to the preceding embodiment 8, wherein the metallocene is unsymmetrically substituted.

10. The multimodal polyethylene according to any of the preceding embodiments 1-9, wherein a film made from the multimodal polyethylene of at least 12 μm in thickness possesses a dart drop of at least 200 grams; the film having been made under extruder conditions of 50 mm line with a 18:1 L/D, 1.0 mm die gap, 100 mm die, grooved feed extruder.

11. The multimodal polyethylene according to any of the preceding embodiments 1-9, wherein a pipe made from the multimodal polyethylene has a PENT (ASTM D F1473-01, 3.0 MPa and 80° C.) value of at least 150.

12. The multimodal polyethylene according to any of the preceding embodiments 1-9, consisting essentially of one high molecular weight fraction and one low molecular weight fraction.

13. A rotomolded product made from the multimodal polyethylene according to any of the preceding embodiments 1-9.

14. A blow molded product made from the multimodal polyethylene according to any of the preceding embodiments 1-9.

Another aspect of the invention is the use of the multimodal polyethylene of any of the above numbered embodiments in a rotomolding process.

Another aspect of the invention is the use of the multimodal polyethylene of any of the above numbered embodiments in a pipe forming process.

Another aspect of the invention is the use of the multimodal polyethylene of any of the above numbered embodiments in a film forming process.

Yet another aspect of the invention is the use of the multimodal polyethylene of any of the above numbered embodiments in a blow molding process.

Another aspect of the present invention is directed to a multimodal polyethylene possessing a density from 0.940 to 0.965 g/cm$^3$, and an $I_{21}$ from 4 to 20 dg/min, and comprising the following ethylene copolymers:

a low molecular weight ethylene copolymer having a weight average molecular weight from 5,000 amu to 50,000 amu; and a high molecular weight ethylene copolymer having a weight average molecular weight from 60,000 amu to 800,000 amu;

characterized in that the weight fraction of the high molecular weight ethylene copolymer relative to the entire multimodal composition ranges from 0.3 to 0.7; and also characterized in that the ratio of the branching index of the low and high molecular weight ethylene copolymers ranges from 1.2 to 6.0.

We claim:

1. A multimodal polyethylene possessing a density from 0.940 to 0.965 g/cm$^3$, and an $I_{21}$ from 4 to 20 dg/min, and comprising the following ethylene copolymers:
   (a) a low molecular weight ethylene copolymer having a weight average molecular weight from 5,000 amu to 50,000 amu and having a short chain branching index from 2.5 to 4.5; and
   (b) a high molecular weight ethylene copolymer having a weight average molecular weight from 60,000 amu to 800,000 amu and having a short chain branching index from 1 to 2.5.

2. The multimodal polyethylene of claim 1, wherein the ratio of the branching index of the low and high molecular weight fraction is in the range of 1.5 to 4.5.

3. The multimodal polyethylene of claim 1, wherein the low molecular weight ethylene copolymer has a short chain branching index from 3 to 4.

4. The multimodal polyethylene of claim 1, wherein the molecular weight distribution of the polyethylene ranges from 30 to 100.

5. The multimodal polyethylene of claim 1, wherein the weight fraction of the high molecular weight ethylene copolymer ranges from 0.3 to 0.7.

6. The multimodal polyethylene of claim 1, wherein the polyethylene is produced in a single continuous fluidized bed gas phase reactor.

7. The multimodal polyethylene of claim 4, wherein the polyethylene is produced by contacting ethylene and a $C_3$-$C_8$ α-olefin with a bimetallic catalyst composition comprising a metallocene and a non-metallocene catalyst.

8. The multimodal polyethylene of claim 7, wherein the metallocene is a bis-cyclopentadienyl complex of a Group 4 metal; wherein the cyclopentadienyl is selected from the group consisting of cyclopentadienyl, indenyl, tetrahydroindenyl, and substituted versions thereof.

9. The multimodal polyethylene of claim 8, wherein the metallocene is unsymmetrically substituted.

10. The multimodal polyethylene of claim 1, wherein a film made from the multimodal polyethylene of at least 12 μm in thickness possesses a dart drop of at least 200 grams; the film having been made at a 4:1 BUR on a 50 mm (L/D=18) grooved feed grooved feed extruder with 100 mm die and 1.0 mm die gap.

11. The multimodal polyethylene of claim 1, wherein a pipe made from the multimodal polyethylene has a PENT (ASTM D F1473-01, 3.0 MPa and 80° C.) value of at least 150.

12. The multimodal polyethylene of claim 1 consisting essentially of one high molecular weight fraction and one low molecular weight fraction.

13. A rotomolded product made from the multimodal polyethylene of claim 1.

14. A blow molded product made from the multimodal polyethylene of claim 1.

15. A multimodal polyethylene possessing a density from 0.940 to 0.965 g/cm$^3$, and an I21 from 4 to 20 dg/min, and comprising the following ethylene copolymers:
   (a) a low molecular weight ethylene copolymer having a weight average molecular weight from 5,000 amu to 50,000 amu; and
   (b) a high molecular weight ethylene copolymer having a weight average molecular weight from 60,000 amu to 800,000 amu;
   wherein the weight fraction of the high molecular weight ethylene copolymer relative to the entire multimodal composition ranges from 0.3 to 0.7; and
   wherein the ratio of the branching index of the low and high molecular weight ethylene copolymers ranges from 1.2 to 6.0.

16. The multimodal polyethylene of claim 15, wherein the ratio of the branching index of the low and high molecular weight ethylene copolymers ranges from 1.5 to 5.0.

17. The multimodal polyethylene of claim 15, wherein the ratio of the branching index of the low and high molecular weight ethylene copolymers ranges from 1.8 to 4.5.

18. The multimodal polyethylene of claim 15, wherein the polyethylene is produced in a single continuous fluidized bed gas phase reactor.

19. The multimodal polyethylene of claim 18, wherein the polyethylene is produced by contacting ethylene and a $C_3$-$C_8$ α-olefin with a bimetallic catalyst composition comprising a metallocene and a non-metallocene catalyst.

20. The multimodal polyethylene of claim 19, wherein the metallocene is a bis-cyclopentadienyl complex of a Group 4 metal; wherein the cyclopentadienyl is selected from the group consisting of cyclopentadienyl, indenyl, tetrahydroindenyl, and substituted versions thereof.

21. The multimodal polyethylene of claim 19, wherein the metallocene is unsymmetrically substituted.

* * * * *